(12) United States Patent
Rusko et al.

(10) Patent No.: US 8,753,179 B2
(45) Date of Patent: Jun. 17, 2014

(54) DEVICE FOR AUTOMATICALLY AND MECHANICALLY PROCESSING PIECES OF MEAT CONVEYED IN A ROW AND METHOD CARRIED OUT BY MEANS OF THE DEVICE

(75) Inventors: Torsten Rusko, Herrnburg (DE); Falko Nixdorf, Lübeck (DE); Oliver Grimm, Schwerin (DE)

(73) Assignee: Nordischer Maschinenbau Rud. Baader GmbH + Co. KG (DE)

( * ) Notice: Subject to any disclaimer, the term of this patent is extended or adjusted under 35 U.S.C. 154(b) by 0 days.

(21) Appl. No.: 13/825,868

(22) PCT Filed: Oct. 14, 2011

(86) PCT No.: PCT/EP2011/067996
§ 371 (c)(1),
(2), (4) Date: Jun. 27, 2013

(87) PCT Pub. No.: WO2012/049295
PCT Pub. Date: Apr. 19, 2012

(65) Prior Publication Data
US 2013/0303064 A1  Nov. 14, 2013

(30) Foreign Application Priority Data
Oct. 16, 2010  (DE) .......................... 10 2010 048 767

(51) Int. Cl.
*A22C 18/00*     (2006.01)
(52) U.S. Cl.
USPC ........................................................ 452/150
(58) Field of Classification Search
USPC ......... 452/125, 126, 149–151, 154, 155, 157, 452/160–162, 170; 83/77, 365, 367, 370, 83/371, 471.3, 486.1, 488
See application file for complete search history.

(56) References Cited

U.S. PATENT DOCUMENTS

| | | | | |
|---|---|---|---|---|
| 4,557,019 A | * | 12/1985 | Van Devanter et al. | ....... 452/157 |
| 5,378,194 A | * | 1/1995 | Hjorth | ............................ 452/170 |
| 6,120,369 A | * | 9/2000 | Eide | ............................... 452/149 |

FOREIGN PATENT DOCUMENTS

| | | |
|---|---|---|
| DE | 102005047752 B3 | 10/2006 |
| EP | 2236040 A1 | 10/2010 |
| WO | 03037090 A1 | 5/2003 |

OTHER PUBLICATIONS

International Search Report dated Mar. 28, 2012 from International Patent Application No. PCT/EP2011/067996 filed Oct. 14, 2011 (5 pages).
Preliminary Report on Patentability dated Apr. 16, 2013 from International Patent Application No. PCT/EP2011/067996 filed Oct. 14, 2011 (11 pages).
Office Action dated Aug. 4, 2011 from German Patent Application No. 102010048767.8 filed Oct. 16, 2010 (10 pages).

* cited by examiner

*Primary Examiner* — Richard Price, Jr.
(74) *Attorney, Agent, or Firm* — Schmeiser, Olsen & Watts

(57) ABSTRACT

An apparatus for the automated mechanical processing of pieces of meat conveyed in a row comprises a transporting device, a cutting device having a cutting head and a control device. The cutting device comprises a holding and guiding device on which the cutting head is movably arranged to execute separating cuts at an angle to the straight conveying direction along the straight movement path at a fixed guiding tilt angle ($\alpha$). A transport belt forming a component of the transporting device and transporting the meat pieces in a lying manner passes continuously by the holding and guiding device. The cutting element which, for cutting, is formed by a rotationally driven circular blade limited at its height position over the transport belt. The control device correlates a velocity component ($V_T$) of the movement velocity of the cutting head, which velocity component of the movement is in conveying direction with the conveying velocity of the meat pieces in the conveying direction when executing the separating cuts. The apparatus is used in particular to skin fish fillets, wherein a tail end section is cut off of the fish fillet with a chamfer cut that generates a fillet end chamfered at a slant as an insertion aid for drawing in the skin to be removed into the draw-in gap of a skinning machine.

12 Claims, 4 Drawing Sheets

Figure 2:
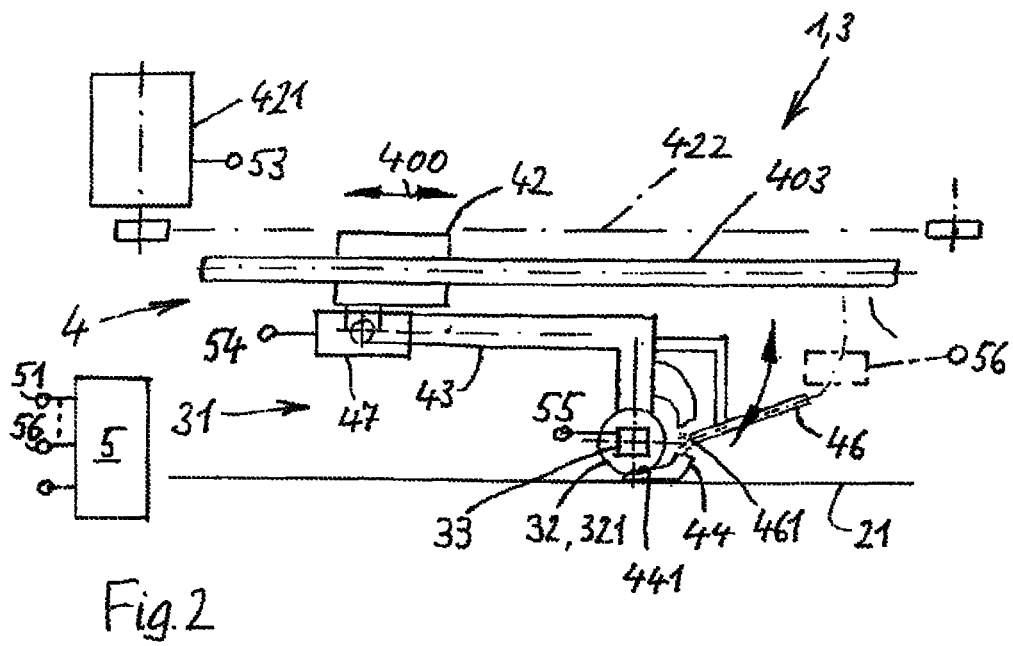

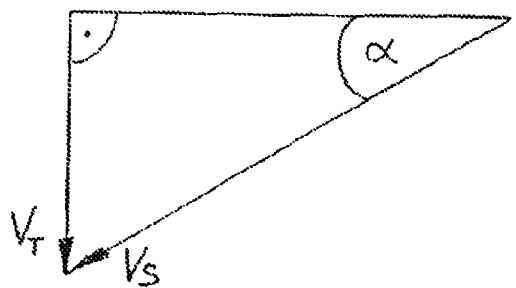
Fig. 5
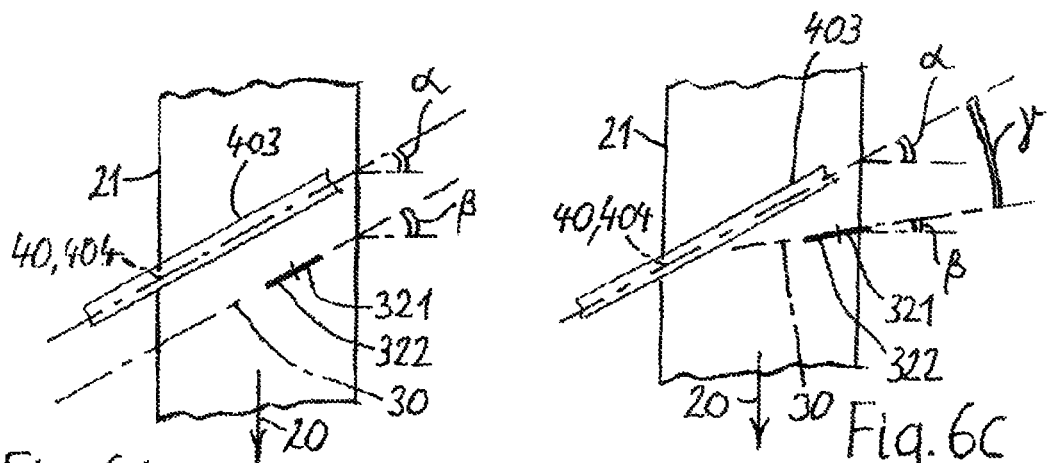
Fig. 6A
Fig. 6C
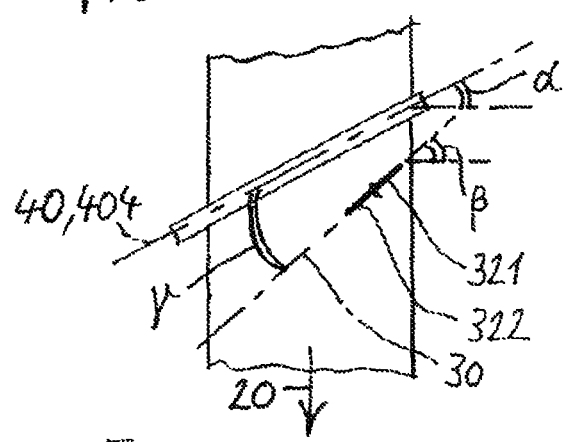
Fig. 6B

DEVICE FOR AUTOMATICALLY AND MECHANICALLY PROCESSING PIECES OF MEAT CONVEYED IN A ROW AND METHOD CARRIED OUT BY MEANS OF THE DEVICE

The invention relates to an apparatus for the automated mechanical processing of pieces of meat conveyed in a row comprising a transporting device that conveys the pieces of meat in succession and in the conveying direction, a cutting device that has a cutting head bearing a cutting element and executes separating cuts that cut sections of meat from the pieces of meat, and a control device that controls the cutting device for executing the separating cuts. It also relates to a method that can be performed with the apparatus in preparation for skinning of fish fillets conveyed in a row comprising the pieces of meat to be skinned.

Various generic processing apparatuses with cutting devices are known. For example, in a trimming machine edge cuts are performed at a right angle to the longitudinal axis of the fillet at the tail end of fish fillets with and without skin. The tail cut is usually performed with a controlled guillotine knife (e.g. WO03/037090 A1). The guillotine knife aligned at a right angle to the longitudinal axis of the fillet or the conveying direction needs a gap which interrupts the transport surface that it penetrates. Two transport belts are required between which the fish products (meat pieces or fish fillets) are transferred during cutting. Such belt transfers are complicated. They are equipped with at least two belt drives that are controlled in conjunction with associated sensors that detect the positions and paths of the fish. The guillotine knives operate in correlation with the conveying velocity (transport speed) to create a cut with a blunt surface. For example, the pulling-in device of a skinning machine is necessarily subject to special measures for blunt-surface fillet ends of fish fillets for skinning that are skinned mechanically. A certain amount of waste it is inevitable and, in particular, the throughput speed and trouble-free operation are impaired. Cutting devices that use water jets or laser beams for cutting instead of a guillotine knife are also relatively complicated to design and control and produce blunt cut surfaces.

The goals of the invention are to process the meat pieces (meat products in general) with an automatically operating cutting device having a design that retains relatively simple mechanics and controls, and can nevertheless be operated at a high throughput speed that creates specific angled or transversely curved cut surfaces transverse to the direction of cutting. The goal is also to prepare for skinning fish fillets conveyed in a row to be skinned.

These goals are achieved in conjunction with the features of the aforementioned apparatus in that the cutting device comprises a holding and guiding device on which the cutting head is movably arranged to execute the separating cuts at an angle to the straight conveying direction along a straight movement path at a fixed guiding tilt angle, that a transport belt forming a component of the transporting device and transporting the fish pieces in a lying manner continuously passes by the holding and guiding device, that the cutting element is formed by a rotationally driven circular blade which, for cutting, is limited at its height position over the transport belt, and, in order to cut, that the control device correlates a velocity component of the movement velocity of the cutting head, which velocity component of the movement is directed in the conveying direction, with the conveying velocity of the meat pieces in the conveying direction when making the separating cuts. According to a method in the preparation for skinning of fish fillets conveyed in a row forming meat pieces and to be skinned, a tail end section is removed from each fish fillet according to the invention by means of a chamfer cut using an apparatus according to the invention, the chamfer cut producing a fillet end chamfered at a slant that, as such, is set back relative to the cut edge of skin and serves as an insertion aid for drawing in the skin to be removed into the draw-in gap of a skinning machine that removes skin.

A series of advantages is achieved. The cutting device according to the invention comprises a transporting device that is easy to construct and to control in the form of the transport belt that extends continuously under the knife head without interrupting the conveying surface. As a consequence of the arrangement and guidance of the circular blade according to the invention, a particular cut surface results from the thickness of the meat to be cut, the oblique angle of the guidance of the cutting head or circular blade, the type of cut with the circular blade and, if applicable, the movement velocity of the circular blade, which cut surface is formed by a type of chamfer, i.e., by a surface that is oblique to a selective degree, that, being oblique, may also be more or less concave, and that results in forming meat pieces, which runs at a sharp angle and is set back transverse to the direction of cutting. Such cut surfaces generated according to the invention will be termed chamfered surfaces in the following. The cut surface is transverse to the line of the cut and may also be grooved in a curve. One achieves an enlarged cut surface transverse to the direction of the cut, in contrast to a perpendicular (blunt) cut surface. Such a cut surface forms in particular an at least substantially sharp-angled cut surface more or less strongly set back from the skin side or cut skin edge, in particular on a meat product to be skinned, i.e., at the tail-side end of a fish fillet to be skinned that has been freed of its tail end section by means of the separating cut according to the invention, said cut surface per se forming in particular an insertion aid for drawing in the skin to be removed into the draw-in gap of a skinning machine to remove skin. The movement of the knife head, especially in conjunction with a movable slide that bears it, can be operated with conventional mechanical drives and electrical controls which work in conjunction with the positions or paths of the devices, such as sensors, detecting the products to be processed. Such controls can include conventional program-controlled control specifications and procedures adapted to the product to be processed. The velocity component of the movement velocity of the cutting head running in the conveying direction when executing the separating cuts correlates with the conveying velocity of the meat pieces in the conveying direction such that the two velocities interact with each other in a controlled manner, wherein the velocity components of the movement velocity running in the conveying direction is at least substantially equal to the conveying velocity of the meat pieces, and can if applicable also be adjusted up or down by a specific amount.

The rotationally driven circular blade is set up such that it remains fixed at its height position over the conveyor belt when cutting. In general, each piece of meat is guided over and against a cutting brace. This can be easily fixedly attached to the cutting head, wherein it comes to lie nearly adjacent to, or slightly rubs against, the transport belt during cutting. The cutting brace is usefully formed with a cutting gap that is designed to receive the circular blade. In any case, the arrangement is such that for cutting the cutting brace can be moved under the meat piece to be cut. The associated lifting of the meat piece can be supported by a lifting device that advantageously generates at least one water jet which is aligned to lift the meat piece. Such a lifting device is advantageously arranged on the knife head. This generates a particularly high jet intensity in the lifting region.

In another advantageous design, the cutting head comprises a holding-down device that acts on each piece of meat while the separating cuts are being made. Such a holding-down device is lowered for cutting by suitable, conventional controls, and lifted during the return movement of the circular blade after the separating cut has been made.

In one embodiment of the invention, the holding and guiding device, viewed in the conveying direction, has an upstream first end and a downstream second end, and the control device and holding and guiding device are arranged such that the cutting head with the circular blade executes separating cuts proceeding from the first end and is moved back to the first end after reaching the end of the separating cut. The arrangement can be advantageously such that the circular blade can be lowered from an elevated position in a non-cutting state to at least one cutting position limited by an end position.

According to a particularly preferred and effective measure of the invention, the circular blade plane of the circular blade can be aligned at a particular cutting angle relative to the direction of the straight movement path of the cutting head. This influences the chamfer cut or chamfer surface to a particular degree. Thus it has been found that the chamfer surface can be changed over a wide range in accordance with the alignment of the circular blade relative to the direction of the straight movement path of the cutting head by means of the angled guidance under the guiding tilt angle provided according to the invention. A particularly pronounced, relatively flat chamfer surface is achieved that consequently recedes relatively far back perpendicular to the direction of the cut when the cutting angle between the circular blade plane and the movement path of the cutting head is positive, i.e. by aligning the circular blade plane relative to the conveying direction with a greater blade tilt angle than the guiding tilt angle of the circular blade. Given such a cutting angle, the chamfer surface can be relatively large, that is, configured relatively flat in respect to the transport surface. If said cutting angle decreases from a maximum positive angular dimension, the chamfer surface decreases; that is, its alignment relative to the transport surface becomes steeper. If the circular blade plane is aligned at least substantially parallel to the movement path of the cutting head under a cutting angle of zero, a chamfer surface arises with a middle angle amount between the chamfer surfaces with said positive cutting angle and chamfer surfaces with negative cutting angles. The cutting angle is negative because the circular blade plane is aligned at a smaller blade tilt angle relative to the conveying direction than the guiding tilt angle. The greater the absolute negative cutting angle, the smaller the chamfer surface which at least almost completely disappears at a maximum negative cutting angle, i.e., it can transition into an at least substantially perpendicular and accordingly blunt surface relative to the transport surface. Each fixed cutting angle is independent of the magnitude of the guiding tilt angle.

A processing apparatus according to the invention can advantageously be a trimming apparatus for trimming the fish fillets comprising the pieces of meat. In such an apparatus, fish fillets still to be skinned undergo surface trimming Elements on the surface of the fish fillet that are undesirable and/or value-decreasing such as white stomach skin, fin bases or flaws are removed with automated tools. In particular, the cutting device for cutting off the tail end sections of fish fillets to be skinned that form the meat pieces can be set up in such a trimming machine. Such an apparatus is used according to the invention to perform the procedure in preparation of skinning the fish fillets to be skinned.

Dependent claims relate to the named and further practical and advantageous embodiments of the invention. Any combination of the features of the embodiments contributes to the solution according to the invention which is therefore not restricted to a specifically described exemplary embodiment. Furthermore, each partial feature of an exemplary embodiment is to be understood as a partial feature of other embodiments that are not described. Only particularly useful and advantageous embodiments and options of the invention will be described further in the following description of the exemplary embodiments depicted in the schematic drawing.

In the FIGS.

Figure 1:
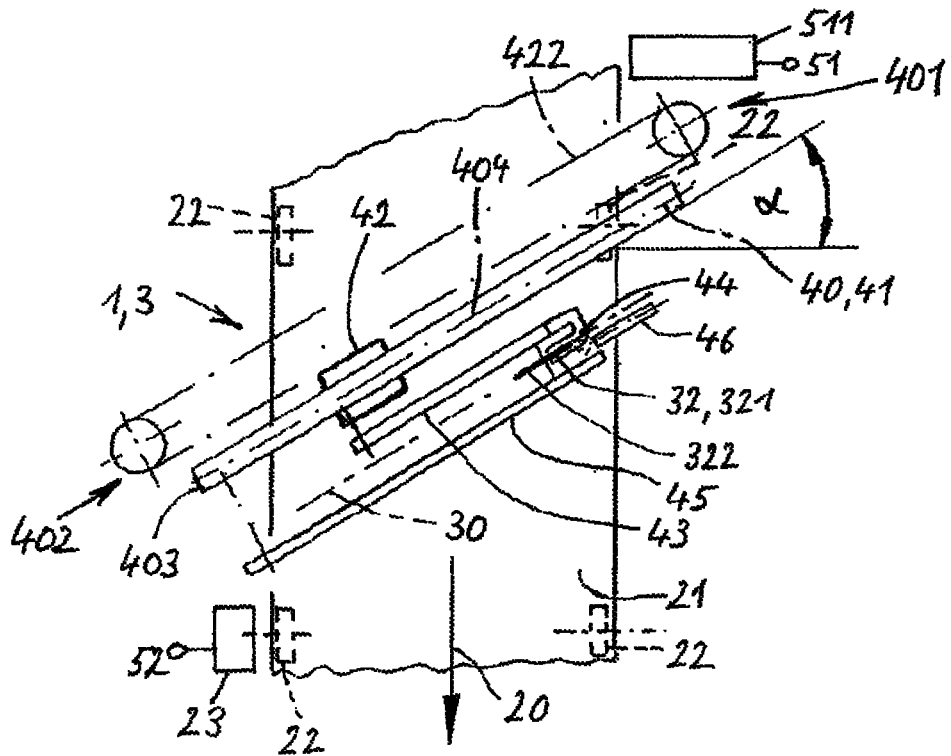
Figure 4:
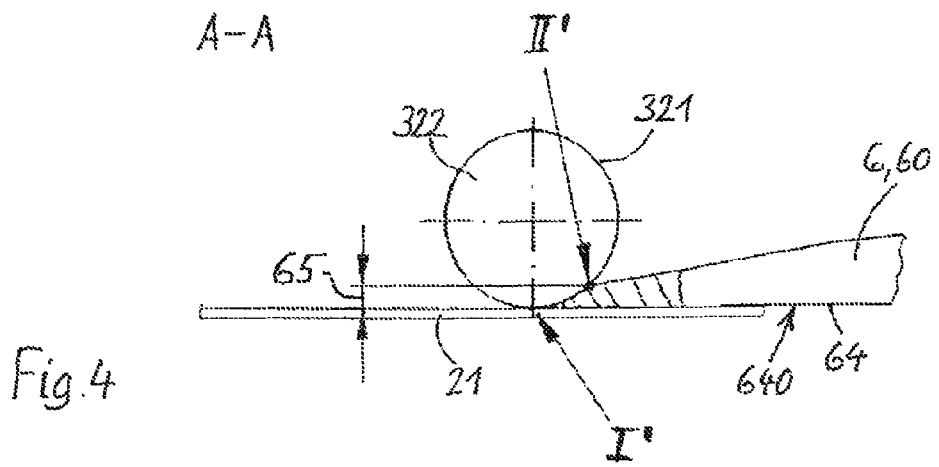
Figure 3:
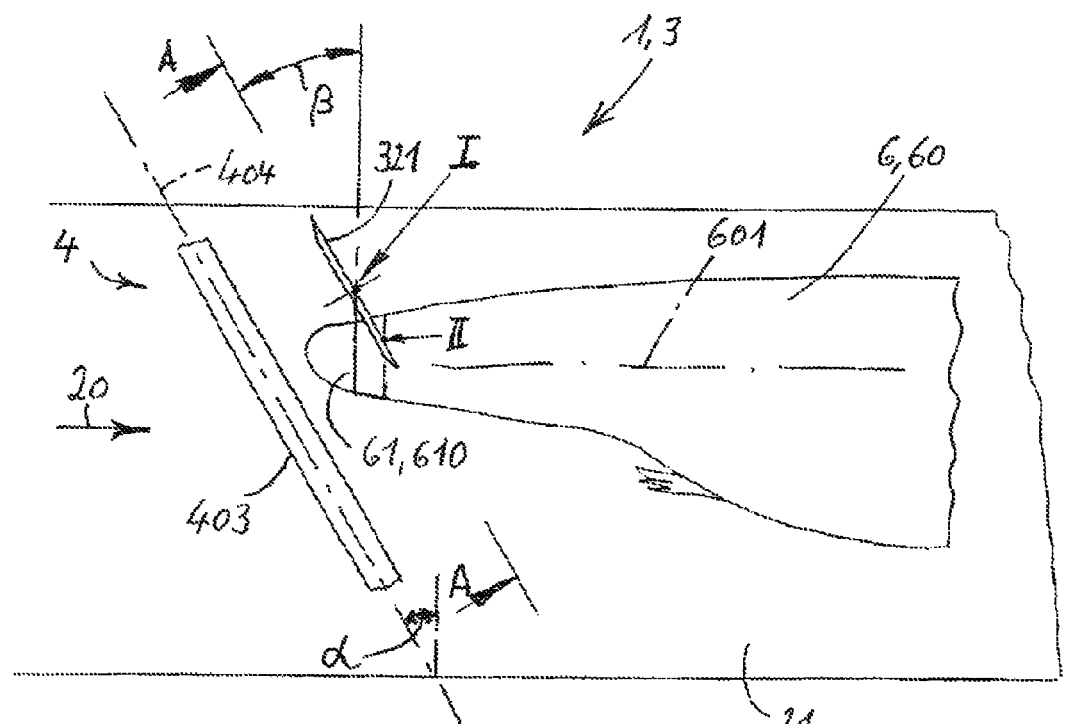
Figure 7:
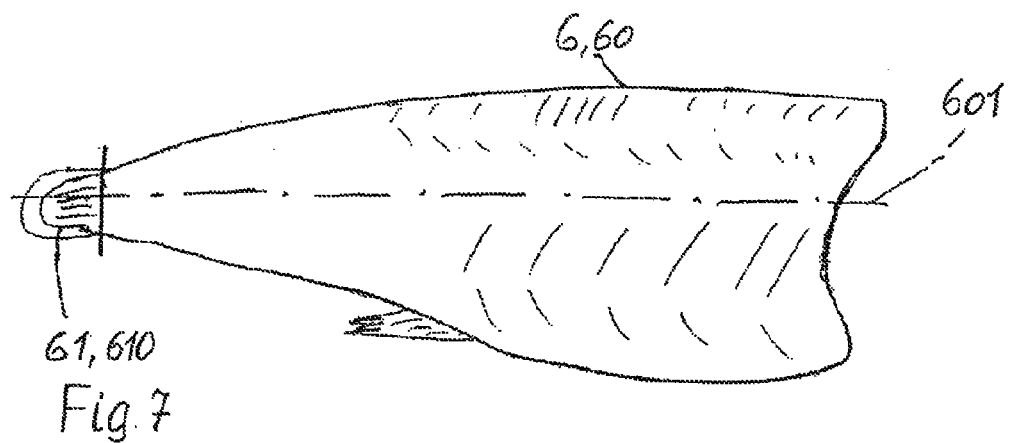
Figure 8:
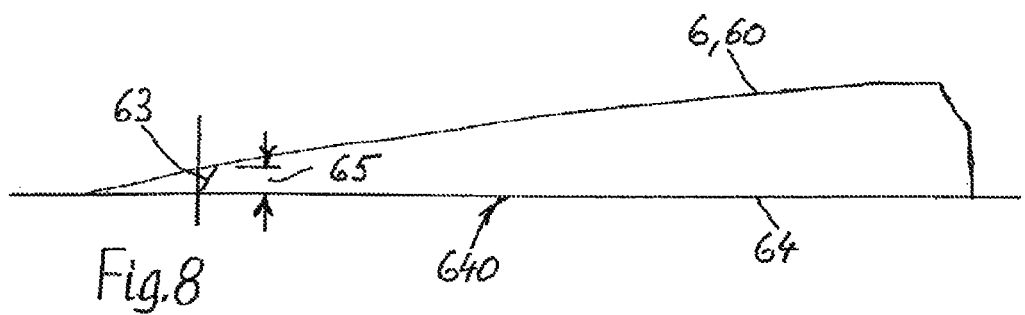
Figure 9:
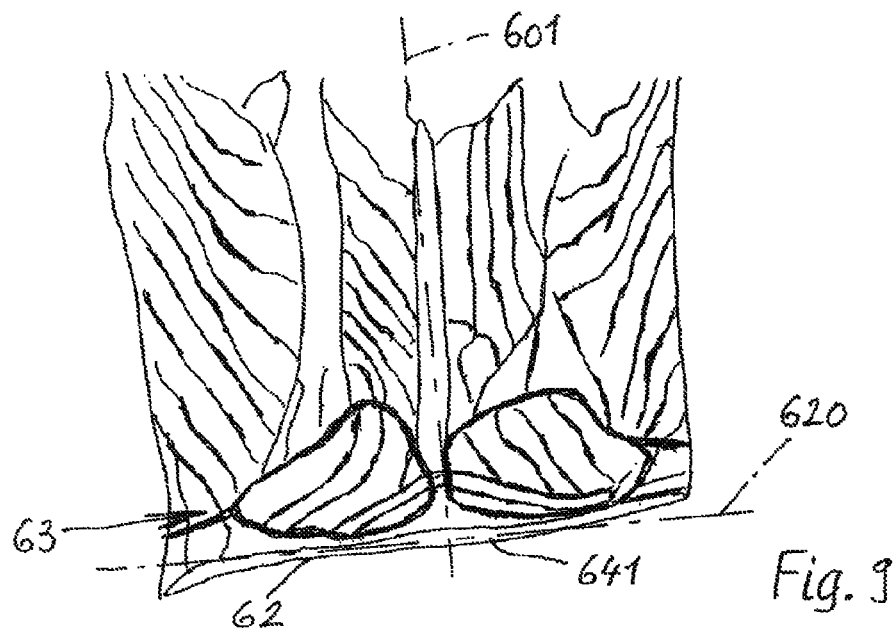

FIGS. 1 and 2 show a top view and side view of an apparatus according to the invention with essential aggregates, FIGS. 3 and 4 show a top view and side view of a blade position at the start of cutting a tail of a fish fillet, FIGS. 5, 6A, 6B and 6C show a depiction of angles with an apparatus according to the invention, FIG. 7 shows a top view of a fish fillet to be processed, and FIGS. 8 and 9 shows a side view and top view of a chamfered cut surface that can be achieved with an apparatus according to the invention.

FIGS. 1 and 2 show a processing apparatus 1 according to the invention which comprises a cutting device 3. A transporting device 2 as well as a control device 5 belong to the equipment of the apparatus 1.

The transporting device 2 comprises a horizontally lying and guided transport belt 21 that is normally guided on rollers 22—that are only indicated with a dashed line in FIG. 1—and is provided with an only schematically portrayed belt drive 23.

In the exemplary embodiment, the processing apparatus 1 is an automated trimming apparatus for trimming the surface of fish fillets forming meat pieces (meat products), and it is only depicted with the cutting device 3 and is not otherwise depicted. As can be seen in FIGS. 3 and 4 as well as 7 to 9, fish fillets 60 lying flat on the transport belt 21 on their skin side 640 are conveyed in the conveying direction 20 with the head side in front. Generally, conveyance with the tail in front is also possible.

The fish fillet 60 such as a salmon or salmon trout fillet has an undesirable section approximately 20 to 40 mm long at the tail end (FIG. 7) depending on the size of the fish. There are tendons, meat discolorations and residual skin there that should not arise in the finished fillet product. The tail end section 610 is a section of meat 61 which is cut off with a trimming cut at least substantially at a right angle to the longitudinal axis 601 of the fillet. The cutting device 3 according to the invention executes such a separating cut as shown in the example in FIGS. 8 and 9 and described further below.

FIGS. 3 and 4 show an example of the position of a fish fillet 60 under the cutting device 3 at the start of the separating cut, wherein the transport belt 21 passes continuously under the cutting device 3; thus, it is continuously tightened and guided under the cutting device 3.

As can be seen in particular in FIGS. 1 and 2, an essential element of the cutting device 3 is a holding and guiding device 4 that has a holding/guiding bar 403 which is arranged fixed relative to the frame and which extends in angled position above the transport belt 21 and at an unchanging free height. When viewed in the conveying direction 20, the bar 403 has an upstream, first end 401, and a downstream second end 402. The angled position of the holding/guiding bar 403 is determined by a fixed guiding tilt angle a under which the bar 403 extends transverse to the conveying direction 20 or to a corresponding straight longitudinal direction of the apparatus corresponding to the line of operation of the apparatus 1. The frame of the apparatus 1 as well as the arms, brackets, extension arms, and the like that hold and bear the individual apparatus aggregates or parts are not portrayed. A cutting head 31 of the cutting device 3 is mounted and guided to move back and forth on the bar 403 in the longitudinal direction of the bar 403 in the straight direction of movement 400 under tilt angle a. This bearing comprises a driven slide 42 that is guided back and forth on the bar 403. The slide 42 can for example be moved by means of a circulating toothed belt 422 which is driven by a motor drive 421.

The holding/guiding bar 403 is portrayed in the drawing as a simple, portal-like bar. Of course, the bar can be formed by a frame comprising a plurality of transverse bars, for example, in a practical design.

The cutting head 31 of the cutting device 3 comprises a plurality of interacting parts forming the actual cutting aggregate. A cutting organ or cutting element 32 is formed by a rotatingly driven circular blade 321 that is articulated to the free end of a swivel arm or lever 43 articulated to the slide 42 in a pivotable manner such that the swivel lever 43 extending parallel to the bar 403 determines the height position of the circular blade 321 above the transport belt 21 depending on the swivel position. Accordingly, the centre of the circular blade 321, the blade plane 322 of which is perpendicular to the surface of the transport belt 21 in the exemplary embodiments, can be moved along a line parallel to the bar 43 termed the blade line 30 in the following.

The swivelling articulation of the swivelling lever 43 on the slide 42 comprises a swivel drive formed by an actuating device 47 which, depending on the position of the circular blade 321, assumes at least two fixed swivel positions along the blade line 30 so that the circular blade 321 can execute an elevated or vertical movement between two end positions. Any other controlled adjustment of the height is possible. The cutting head 31 or circular blade 321 can accordingly be placed in a bottom position that is close to the transport belt 21 and hence executes the separating cut (FIGS. 1 and 2), as well as a top return and start position assumed after the separating cut is executed.

Furthermore, a leverage-resistant cutting brace 44 is arranged on the cutting head 31, and its contact surface bracing the product to be cut 6, 60 extends below the circular blade 321. A cutting gap 441 is formed in the bracing surface in which the cutting edge of circular blade 321 engages.

A lifting device 46 is arranged on the free end of the swivelling lever 43, also being leverage-resistant thereto, and it is equipped with a water jet nozzle 461 in the exemplary embodiment. The rising or lifting of the fish fillet 60 to the bracing surface can be assisted by this water jet, the nozzle of which is located close to the bottom zenith region of the circular blade 321.

The holding and guiding device 4 is also equipped with a holding-down device 45 which is only schematically portrayed in FIG. 1. This is for example a bracket that is articulated to the apparatus frame at its end facing away from the circular blade 321 or, as shown, to the downstream end of the holding/guiding bar 403, and its other end is articulated to the blade-side end of the swivelling lever 43 by means of a roller guide.

The control device 5 comprises conventional control parts and sections that control the automatic operation of the cited active organs, that is, the transport belt drive 23, the slide drive 421, the actuating device 47 of the knife rotary drive 33 and the lifting device 46, the latter if applicable by controlling the water jet. The position or movement of each fish fillet 60 on the transport belt 21 is detected in the usual manner, for example by means of a motion sensor 511. The control device 5 is connected to the cited control elements and actuating and drive devices by means of linked connections 51 to 56, or generally by an appropriate operative connection.

With reference to the exemplary embodiment portrayed in FIGS. 1 to 4, the procedure will be described for a separating cut of a fish fillet 60 passing through the cutting device 3.

In the initial or start position (not shown), the cutting head 31 is in elevated position with the circular blade 321 and the other parts of the cutting head 31 at the upstream end 401 of the holding and guiding device 4. When a fish fillet 60 approaches the cutting device 3, the cutting head 31 is first lowered to the bottom end position at the edge region of the transport belt 21 as shown in FIGS. 1 and 2. Once the end of the fillet reaches the path position calculated by the controls for the separating cut to be executed which cuts off the tail end section 610, the rotatingly driven circular blade 321 is moved by means of the controlled slide 42 along the blade line 30, that is, executes the separating cut. Once the separating cut is finished, advantageously at the same time or close to the time at which the circular blade 321 exits the fish fillet 60, the cutting head 31 is lifted to the top end position. The holding-down device 45 is simultaneously lifted by the roller connection at the free end of the swivelling lever 43. In a lifted state, the slide is moved back to the initial position for the next cut.

At the beginning of the separating cut, the cutting brace 44 moves under the fish fillet 60, wherein the separating cut is executed by means of the circular blade 321 engaging in the cutting gap 441. The holding-down device 45 lies on the fish fillet 60 with its own weight. It prevents the fish fillet 60 from moving to the side while being lifted to the cutting brace 44 and while cutting.

As can be seen in FIGS. 8 and 9, the separating cut creates a cut edge 62 at least substantially perpendicular to the conveying direction 20, or to the longitudinal axis of the fillet 601. A line 620 perpendicular to the conveying direction 20 is correspondingly portrayed. The cut is executed in that the velocity component $V_T$ of the movement velocity $V_S$ of the cutting head 31 running in the conveying direction is correlated by the control device with the conveying velocity of the fish fillet 60, or the conveying speed of the transport belt 21. The correlation is always such that the separating cut is executed at least nearly perpendicular to the conveying direction 20 or the longitudinal axis of the fillet 601 along the cutting/separating line 620. Under conditions that are established with an apparatus 1 corresponding to the exemplary embodiment, the velocity of the slide 22 at a guiding tilt angle $\alpha=30°$ is twice as fast as the velocity $V_T$, corresponding to the relationship portrayed in FIG. 5 of $V_T=V_S \sin \alpha$.

According to the embodiment depicted in FIGS. 1 and 2, the blade plane 322 of the circular blade 321 is aligned parallel to the above-described blade line 30 or the direction 400 of the movement path 40. This arrangement is also depicted in FIG. 6A. A special effect is achieved in that the circular blade 321 is configured at a specific cutting angle $\gamma=\beta-\alpha$. The cutting angle $\gamma$ is understood to be the angle between the above-defined blade line 30 and the slanted axis 404 of the holding and guiding device 4 (corresponding to the direction of the movement path 400). In FIGS. 1 and 6A, $\gamma=0$; this yields a medium-sized chamfer surface.

The generation of the chamfer surface is illustrated with reference to FIGS. 3 and 4. Once the circular blade 321 is moved through the fillet 60 in the described manner, a chamfer or curved surface arises as a result of the fillet thickness 65 (FIG. 4), the angle $\gamma$ and the circular blade cut and corresponds approximately to the radius of the circular blade across the fillet thickness 65. The curve line of such surfaces runs from position I or I' to II or II'.

FIG. 6B shows a circular blade 321 with a positive cutting angle γ. Such a positive cutting angle γ is defined in that the blade line 30 is aligned at a blade tilt angle β relative to the conveying direction 20 that is larger than the guiding tilt angle α. It has been found that a special chamfered cut is thereby achieved as shown as an example in FIGS. 8 and 9 with the cut fish fillet 60 to be skinned. A chamfered surface 63 or its chamfered sections that are set back at a sharp angle in an angled position from the outer cut edge 62 forming the skin cutting edge. This yields an edge of meat which, along the cut edge 62, frees the meat from the skin to be removed from the fish fillet 60 to a particular extent at the edge side, or exposes it to an at least substantially reduced degree in the thickness of the meat. The greater the selected positive cutting angle, the more distinct the chamfered surface.

In another exemplary embodiment as shown in FIG. 6C, the cutting angle γ=β−α between the blade line 30 and the slanted axis 404 or the direction 400 of the movement path 40 is negative in that the blade tilt angle β between the blade line 30 and the conveying direction 20 is less than the guiding tilt angle a of the holding and guiding device 4. With such a negative blade tilt angle β, steep chamfered surfaces relative to the transport belt surface can be achieved and at least be made to nearly disappear.

According to the invention, the trimming apparatus described in the exemplary embodiment can be advantageously used to prepare the fish fillets 60 freed from their tail end sections to be supplied to an automated skinning machine (not shown). Such skinning machines are generally known. They generally have a draw-in gap into which the skin to be removed is drawn so that it can be removed from the fillet meat. Drawing into such a gap is significantly difficult when the cut edge surface of the tail cut is blunt or substantially perpendicular to the fillet conveying plane (transport belt surface). Assistance is easily provided by the invention in that the cut edge surface as prominently displayed in FIGS. 8 and 9, is cut with an angled chamfer surface by means of the apparatus 1 according to the invention, wherein a skin edge or skin margin 641 arises that is grasped much more easily and reliably than usual by means of the draw-in gap of an advantageously automated skinning machine.

The invention claimed is:

1. An apparatus for the automated mechanical processing of pieces of meat conveyed in a row, comprising a transporting device that conveys the pieces of meat in succession and in the conveying direction, a cutting device that has a cutting head bearing a cutting element and executes separating cuts that cut sections of meat from the pieces of meat, and a control device that controls the cutting device for executing the separating cuts, characterized in that the cutting device comprises a holding and guiding device on which the cutting head is movably arranged to execute the separating cuts at an angle to the straight conveying direction along a straight movement path at a fixed guiding tilt angle (α), that a transport belt forming a component of the transporting device and transporting the meat pieces in a lying manner continuously passes by the holding and guiding device, that the cutting element is formed by a rotationally driven circular blade which, for cutting, is limited at its height position over the transport belt, and that the control device correlates a velocity component ($V_T$) of the movement velocity of the cutting head, which velocity component of the movement is directed in the conveying direction with the conveying velocity of the meat pieces in the conveying direction when executing the separating cuts.

2. Apparatus according to claim 1, characterized in that the cutting head comprises a cutting brace held between the circular blade and the transport belt with a cutting gap in which the cutting blade engages.

3. Apparatus according to claim 2, characterized in that the apparatus comprises a lifting device which lifts the piece of meat to the cutting brace and generates at least one water jet for lifting the piece of meat.

4. Apparatus according to claim 1, characterized in that the cutting head comprises a holding-down device which acts on the piece of meat when separating cuts are being performed.

5. Apparatus according to claim 1, characterized in that the holding and guiding device, viewed in the conveying direction, has an upstream first end and a downstream second end, and the control device and holding and guiding device are arranged such that the cutting head with the circular blade executes separating cuts proceeding from the first end and is moved back to the first end after reaching the end of the separating cut.

6. Apparatus according to claim 1, characterized in that the circular blade is arranged and set up to be lowered from an elevated position in a non-cutting state to a cutting position limited by an end position.

7. Apparatus according to claim 1, characterized in that an angle between the circular blade plane of the circular blade and the movement path of the cutting head and designated as cutting angle (γ) is zero.

8. Apparatus according to claim 1, characterized in that an angle between the circular blade plane of the circular blade and the movement path of the cutting head and designated as cutting angle (γ) is negative in that the circular blade plane is aligned relative to the conveying direction at a smaller blade tilt angle (β) than the guiding tilt angle (α).

9. Apparatus according to claim 1, characterized in that an angle between the circular blade plane of the circular blade and the movement path of the cutting head and designated as cutting angle (γ) is positive in that the circular blade plane is aligned relative to the conveying direction at a greater blade tilt angle (β) than the guiding tilt angle (α).

10. Apparatus according to claim 1, characterized in that the apparatus is a trimming device for trimming the fish fillets forming the pieces of meat.

11. Apparatus according to claim 1, characterized in that the cutting device is set up to cut off tail end sections from the fish fillets to be skinned forming the pieces of meat.

12. A method for preparing the skinning of fish fillets conveyed in a row, forming pieces of meat and to be skinned using an apparatus according to claim 11, characterized in that a tail end section is removed from each fish fillet by means of a chamfer cut, and this produces a fillet end chamfered at a slant that, as such, is set back relative to the cut edge of skin and serves as an insertion aid for drawing in the skin to be removed into the draw-in gap of a skinning machine that removes skin.

* * * * *